United States Patent
Lin et al.

(10) Patent No.: US 10,780,511 B2
(45) Date of Patent: *Sep. 22, 2020

(54) FOLDABLE MITER SAW AND FOLDABLE METHOD OF MITER SAW

(71) Applicant: REXON INDUSTRIAL CORP., LTD., Taichung (TW)

(72) Inventors: Ju Zhen Lin, Taichung (TW); Ya Pin Kuo, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/507,887

(22) PCT Filed: Sep. 9, 2015

(86) PCT No.: PCT/US2015/049147
§ 371 (c)(1),
(2) Date: Mar. 1, 2017

(87) PCT Pub. No.: WO2016/040455
PCT Pub. Date: Mar. 17, 2016

(65) Prior Publication Data
US 2017/0239737 A1    Aug. 24, 2017

Related U.S. Application Data

(60) Provisional application No. 62/048,442, filed on Sep. 10, 2014.

(30) Foreign Application Priority Data

Sep. 12, 2014   (TW) .............................. 103131612 A

(51) Int. Cl.
*B23D 47/02* (2006.01)
*B23D 45/04* (2006.01)
(Continued)

(52) U.S. Cl.
CPC ............. *B23D 47/02* (2013.01); *B23D 45/04* (2013.01); *B23D 45/044* (2013.01); *B23D 57/0092* (2013.01); *B23D 45/025* (2013.01)

(58) Field of Classification Search
CPC ...... B23D 45/044; B23D 45/14; B23D 47/02; B23D 57/002; B27D 27/06; B27D 5/29; B27G 19/02
(Continued)

(56) References Cited

U.S. PATENT DOCUMENTS 1,486,140 A * 3/1924 Hickey .................. A01G 3/053
185/39
4,523,504 A * 6/1985 Alessio .............. B23D 57/0092
144/48.3
(Continued)

FOREIGN PATENT DOCUMENTS

EP          2774731 A1    9/2014
JP        H11_90901 A    4/1999
(Continued)

*Primary Examiner* — Kenneth E Peterson
*Assistant Examiner* — Nhat Chieu Q Do
(74) *Attorney, Agent, or Firm* — Bacon & Thomas, PLLC

(57) ABSTRACT

A foldable miter saw and folding method of miter saw are disclosed. The foldable miter saw includes a base unit, a workable, and a cutting unit. The cutting unit includes a support arm pivotally mounted on the worktable, a saw blade, and a driver. The miter saw folding method includes the step of biasing the cutting unit relative to the base unit and the step of rotating the support arm relative to the base unit and the worktable to change the cutting unit from a working position to a folded position, thus reducing the vertical space occupied by the cutting unit and facilitating delivery, storage and package of the foldable miter saw.

11 Claims, 11 Drawing Sheets

(51) Int. Cl.
  *B23D 57/00* (2006.01)
  *B23D 45/02* (2006.01)

(58) Field of Classification Search
  USPC ........ 83/471.3, 468.7, 477, 471, 581, 477.1,
    83/859, 574, 473, 70; 30/208–210,
    30/216–220
  See application file for complete search history.

(56) References Cited

U.S. PATENT DOCUMENTS

| | | | | |
|---|---|---|---|---|
| 4,827,819 A * | 5/1989 | O'Banion | ............ | B23D 45/025 |
| | | | | 144/285 |
| 6,474,207 B1 | 11/2002 | Itzov | | |
| 9,283,628 B2 * | 3/2016 | Gehret | ................. | B23D 45/044 |
| 9,393,630 B2 * | 7/2016 | He | .......................... | B27B 5/165 |
| 2003/0024366 A1 | 2/2003 | Hollinger et al. | | |
| 2003/0221531 A1 * | 12/2003 | Anthony | .............. | B23D 45/044 |
| | | | | 83/581 |
| 2005/0076618 A1 | 4/2005 | Powers et al. | | |
| 2005/0247177 A1 * | 11/2005 | Hetcher | ................ | B23D 45/044 |
| | | | | 83/471.3 |
| 2008/0110314 A1 | 5/2008 | Johnson et al. | | |
| 2009/0139382 A1 | 6/2009 | Clack | | |
| 2010/0031795 A1 | 2/2010 | Collins | | |
| 2011/0107892 A1 * | 5/2011 | Imamura | .............. | B23D 45/048 |
| | | | | 83/471.3 |
| 2013/0104717 A1 * | 5/2013 | Rees | .................... | B23D 45/048 |
| | | | | 83/468.7 |
| 2013/0133495 A1 * | 5/2013 | Imamura | ................ | B23D 47/02 |
| | | | | 83/471.3 |
| 2013/0160628 A1 | 6/2013 | Chiu | | |
| 2014/0251106 A1 * | 9/2014 | Gehret | ................ | B23D 45/044 |
| | | | | 83/471.3 |
| 2015/0246399 A1 * | 9/2015 | Knight | ................. | B23D 45/044 |
| | | | | 83/397 |

FOREIGN PATENT DOCUMENTS

| | | |
|---|---|---|
| TW | 201325776 A | 7/2013 |
| TW | 201420239 A | 6/2014 |
| WO | WO2014150859 A1 | 9/2014 |

* cited by examiner ered design enables use of less packaging material and reduction of packaging cost during delivery.

FOLDABLE MITER SAW AND FOLDABLE METHOD OF MITER SAW

BACKGROUND OF THE INVENTION

1. Field of the Invention

The present invention relates to processing machinery, and more particularly, to a foldable miter saw and a foldable miter saw folding method.

2. Description of the Related Art

A conventional miter saw (Prior art of Taiwan Patent 201325776) is known comprising a base unit, a worktable rotatable relative to the base unit, a cutting unit connected to the worktable at one lateral side, and a positioning unit. The base unit comprises a bottom frame, and two foot stands respectively fixedly mounted at two opposite lateral sides of the bottom frame. The positioning unit comprises a screw rod threaded into the worktable. When adjusting the cutting angle of the cutting unit, the operator must loosen the screw rod, and then operate the worktable to rotate the cutting unit relative to the base unit. After moving the cutting unit to the desired angle, the screw rod is again tightened.

Further, in Taiwan Patent 201420239, matching between a sector plate-shaped locking member and a positioning unit allows adjustment of the tilting angle of a saw blade of a cutting unit relative to a top wall of a worktable to achieve the desired cutting angle. The maximum tilting angle of the saw blade relative to the top wall of the worktable is 45°.

The aforesaid prior art miter saws allow adjustment of the cutting angle, however, when these miter saws are not in use, the bulk size of these miter saws require a large storage space. Further, when packaging the miter saws for delivery after fabrication, they require much delivery space, which increases the delivery cost.

SUMMARY OF THE INVENTION

The present invention has been accomplished under the circumstances in view. It is the main object of the present invention to provide a foldable miter saw, which can be folded into a folded position to reduce the size of the miter saw for convenient storage and delivery.

It is another object of the present invention to provide a miter saw folding method, which is easy to implement and facilitates collapsing the miter saw.

To achieve these and other objects of the present invention, a foldable miter saw comprises a base unit, a worktable and a cutting unit. The base unit comprises a front edge, a rear edge opposite to the front edge, a bottom wall extended from the front edge to said rear edge, and a top wall opposite to the bottom wall. The worktable is mounted at the base unit, comprising a working surface disposed opposite to the bottom wall corresponding to the top wall and an axle holder facing toward the rear edge and connected to the working surface. Further, the axle holder comprises an axis disposed in parallel to the working surface and extending from the rear edge toward the front edge. The cutting unit comprises a support arm pivotally connected to the axle holder of the worktable and biasable relative to the base unit and the worktable, a saw blade mounted at the support arm, and a driver mounted at the support arm and adapted for driving the saw blade to rotate. The saw blade comprises a first end face, and a second end face opposite to the first end face. The support arm is turnable about said axis relative to the base unit and the worktable to move the cutting unit from a working position where a contained angle within 90° to 45° is formed between the saw blade and the worktable to a folded position where the second end face is disposed in proximity to the working surface and faces toward the working surface.

To achieve these and other objects of the present invention, a foldable miter saw comprises a base unit, a worktable and a cutting unit. The base unit comprises a bottom wall and a top wall opposite to the bottom wall. The worktable is mounted at the base unit, comprising an axle holder. The cutting unit comprises a support arm pivotally connected to said axle holder of said worktable and biasable relative to said base unit and said worktable, a saw blade mounted at said support arm and a driver mounted at said support arm and adapted for driving said saw blade to rotate. The cutting unit is convertible between a working position and a folded position. When in the working position, the cutting unit is movable between a lifted condition and a pressed condition. When the cutting unit is in the pressed condition, a working height is defined between the bottom wall of the base unit and the opposing topmost edge of the cutting unit. When the cutting unit is disposed in the folded position, the support arm can be turned about the axis relative to the base unit and the worktable so that a minimum height is defined between the bottom wall of the base unit and the opposing topmost edge of the cutting unit. Further, the working height is larger than the minimum height. The minimum height is about one half of the working height.

To achieve these and other objects of the present invention, a miter saw folding method comprises the steps as follows:

(A) Prepare a miter saw comprising a base unit, a worktable and a cutting unit. The base unit comprises a front edge, a rear edge opposite to the front edge, a bottom wall extended from the front edge to the rear edge, a top wall opposite to the bottom wall, and a fence fixedly mounted at the top wall. The worktable is mounted at the base unit. The worktable comprises a working surface disposed opposite to the bottom wall and corresponding to the top wall, and an axle holder facing toward the rear edge and connected to the working surface. The axle holder comprises an axis disposed in parallel to the working surface and extending from the rear edge toward the front edge. The cutting unit comprises a support arm pivotally connected to the axle holder of the worktable and biasable relative to the base unit and the worktable, a saw blade mounted at the support arm, and a driver mounted at the support arm and adapted for driving the saw blade to rotate. The saw blade comprises a first end face and a second end face opposite to the first end face. The support arm is turnable about the axis relative to the base unit and the worktable.

(B) Enable the cutting unit to be disposed in a working position where a contained angle within 90° to 45° is formed between the saw blade and the worktable.

(C) Operate the base unit and the cutting unit for relative rotation therebetween.

(D) Bias the support arm relative to the axle holder to turn the cutting unit about the axis relative to the worktable until the second end face of the saw blade is disposed in proximity to the working surface where the cutting unit is disposed in a folded position.

Accordingly, by means of turning the support arm relative to the base unit and the worktable and converting the cutting unit in the folded position, the size of the foldable miter saw is minimized, thus facilitating storage and delivery and reducing the package volume and delivery cost of the foldable miter saw.

BRIEF DESCRIPTION OF THE DRAWINGS

Other advantages and features of the present invention will be fully understood by reference to the following description in conjunction with the accompanying drawings, in which like reference signs denote like components of structure.

Figure 1:
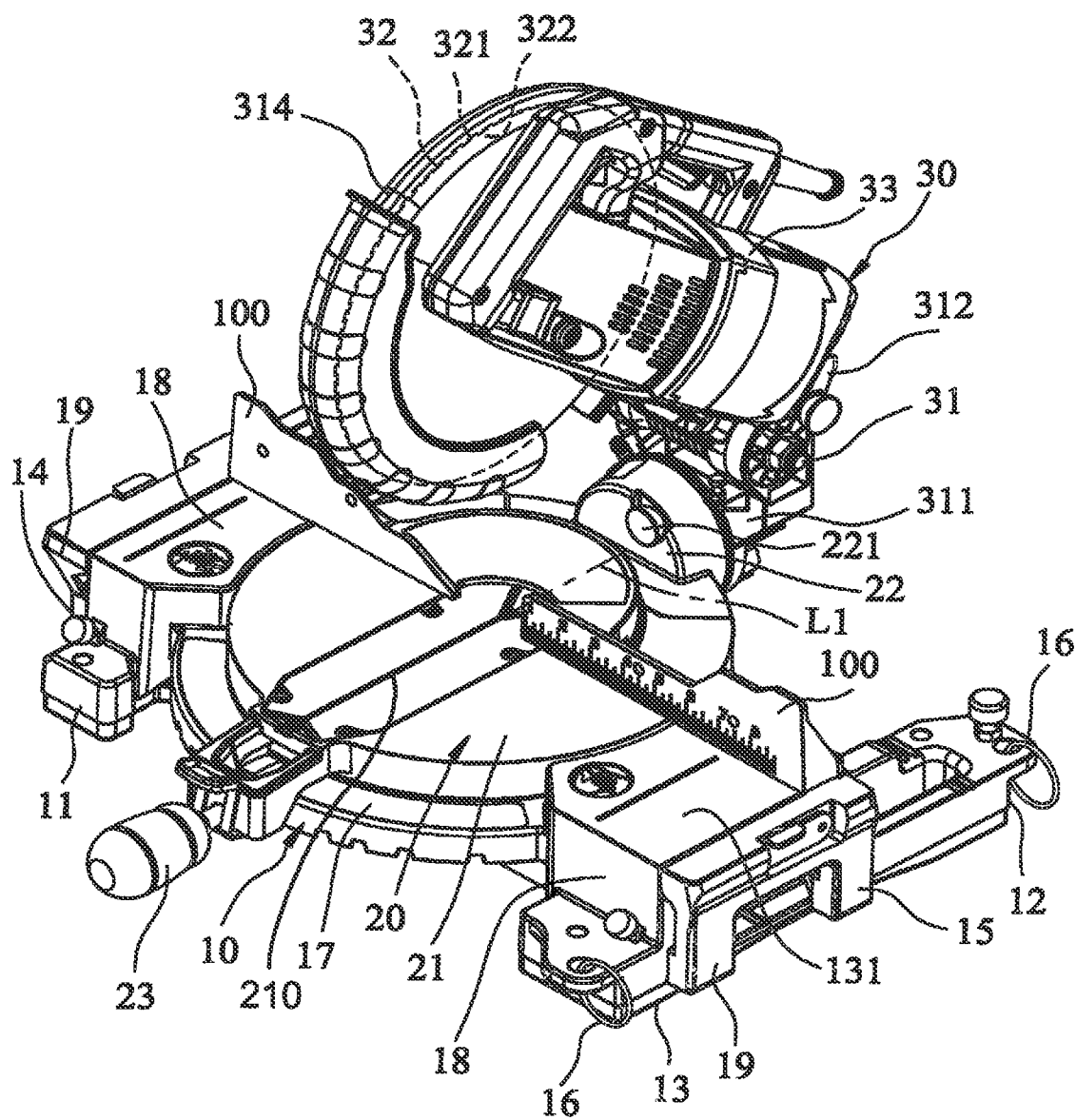
FIG. 1 is a perspective view of a foldable miter saw in accordance with the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of the present invention and the components thereof, and in no way limits the structures, configurations and components thereof according to the present disclosure.

DETAILED DESCRIPTION OF THE INVENTION

Figure 2:
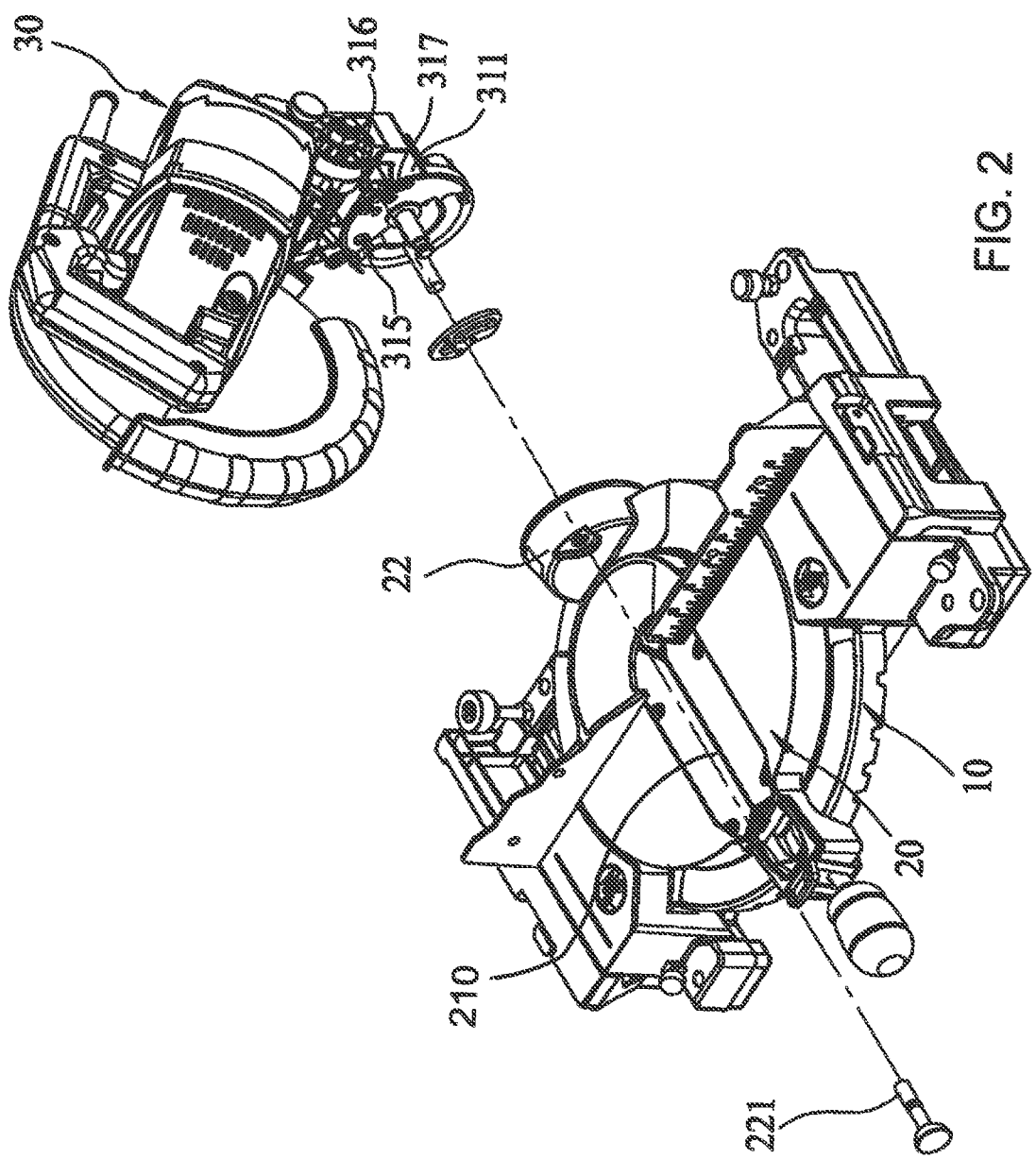
FIG. 2 is an exploded view of the foldable miter saw in accordance with the present invention.
Figure 3:
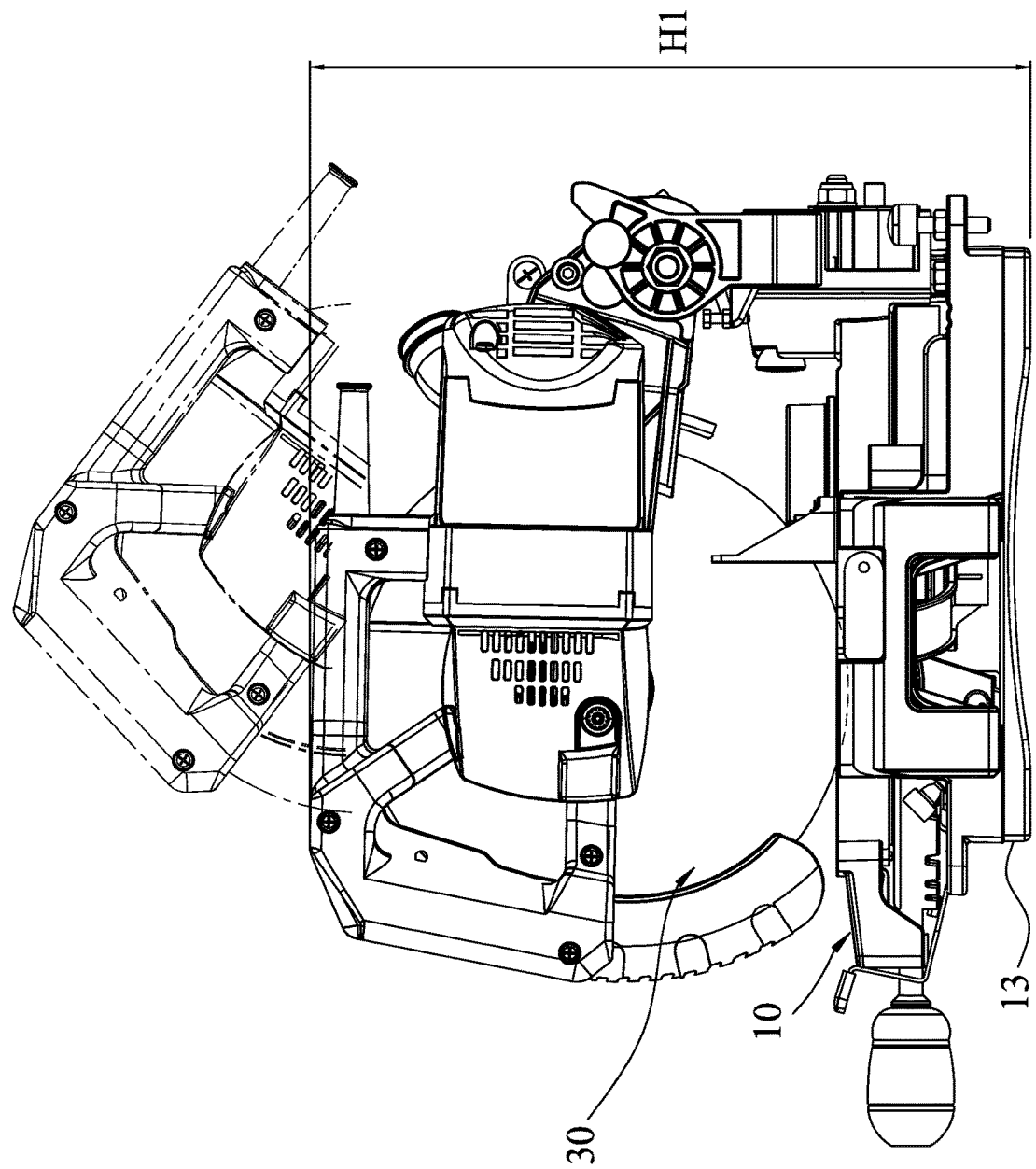
FIG. 3 is a schematic side plane view of the foldable miter saw in accordance with the present invention.

Referring to FIGS. 1, 2 and 3, a foldable miter saw in accordance with the present invention is shown. The foldable miter saw comprises a base unit 10, a worktable 20, and a cutting unit 30.

The base unit 10 comprises a front edge 11, a rear edge 12 disposed opposite to the front edge 11, a bottom wall 13 extended from the front edge 11 to the rear edge 12, a top wall 131 disposed opposite to the bottom wall 13, a left edge 14 connected between the front edge 11 and the rear edge 12, a right edge 15 disposed opposite to the left edge 14, two hanging rings 16 respectively connected to the right edge 15 and spaced from each other at a predetermined distance.

Figure 10:
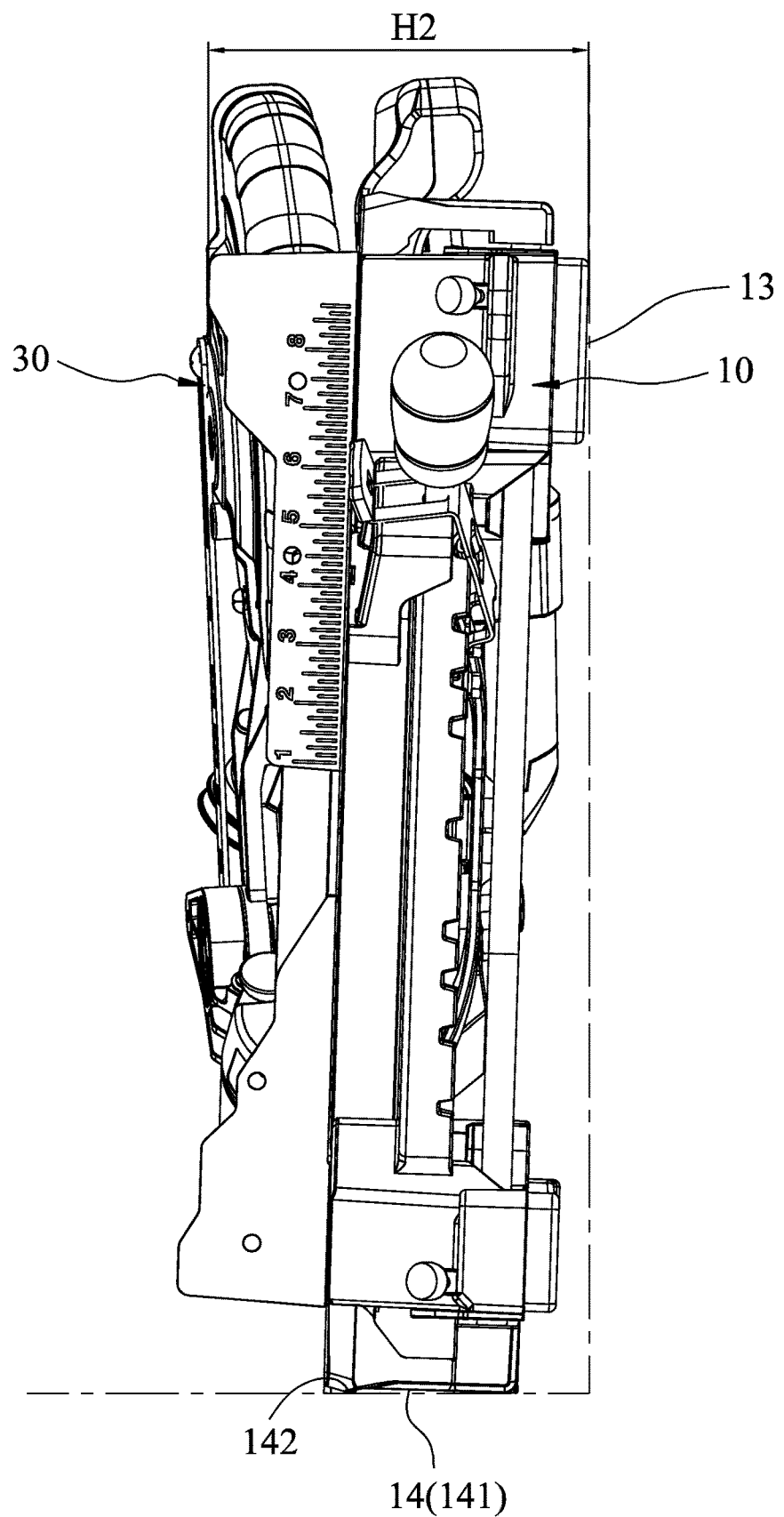
FIG. 10 is a schematic drawing illustrating the base unit of the foldable miter saw erected for storage.

Structurally, the base unit 10 comprises a disk-like bottom frame 17, two foot stands 18 radially connected to two opposite lateral sides of the bottom frame 17, and two support blocks 19 respectively and retractably coupled to the foot stands 18 at an outer side. The front edge 11 and the rear edge 12 are respectively formed along a periphery of the disk-like bottom frame 17 and the foot stands 18. The left edge 14 and the right edge 15 are respectively formed on the foot stands 18 at an outer side. The top wall 131 is formed on the foot stands 18 at a top side. Referring also to FIG. 10, the left edge 14 has a flat surface portion 141 defined therein that extends from the bottom wall 13 toward the top wall 131 and is perpendicularly intersected with the bottom wall 13. A protruding portion 142 is connected to a top side of the flat surface portion 141 and outwardly protruded from flat surface portion 141 in proximity to the top wall 131. The base unit 10 further comprises a fence 100 fixedly mounted at the top wall 131. The fence 100 extends from the tops of the foot stands 18 to a top side above the bottom frame 17.

The worktable 20 is rotatably mounted on a top of the bottom frame 17 of the base unit 10. The worktable 20 has a working surface 21 formed thereon and corresponding to the top wall 131 and opposite to the bottom wall 13, an axle holder 22 connected to the working surface 21 corresponding to the rear edge 12, and an operating handle 23 arranged opposite to the axle holder 22 and extended outwardly relative to the working surface 21. The working surface has a longitudinal slot 210. The axle holder 22 comprises an axis L1 extending from the rear edge 12 toward the front edge 11 in a parallel manner relative to the working surface 21, and an operable locking pin 221. Further, the fence 100 extends from the top wall 131 to the top side of the working surface 21.

Figure 4:
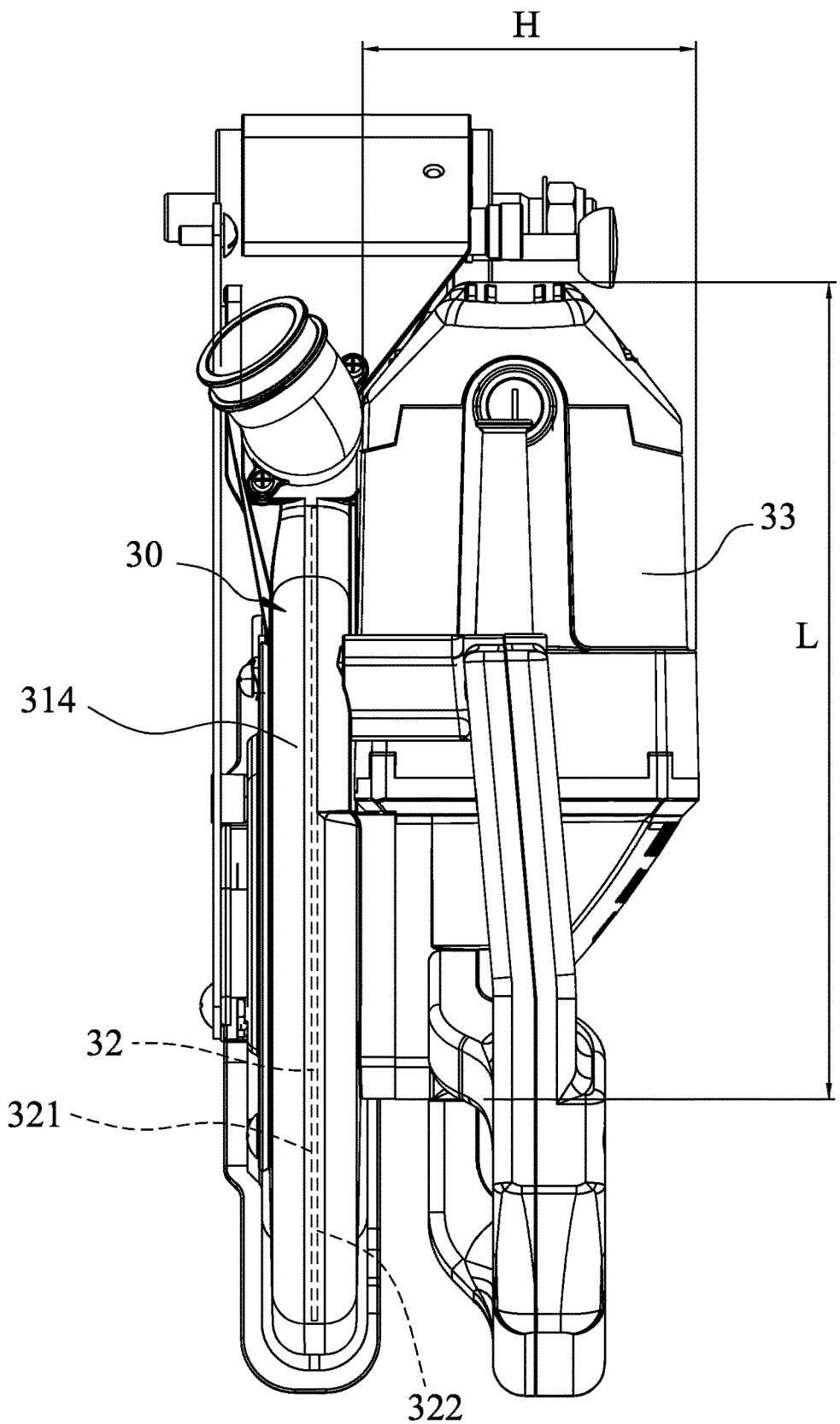
FIG. 4 is a schematic top view of the cutting unit of the foldable miter saw in accordance with the present invention.

The cutting unit 30 comprises a support arm 31 pivotally coupled to the axle holder 22 of the worktable 20 and biasable relative to the base unit 10 and the worktable 20, a saw blade 32 mounted at the support arm 31, and a driver 33 mounted at the support arm 31 and adapted for driving the saw blade 32 to rotate. The support arm 31 is turnable about the axis L1 relative to the base unit 10 and the worktable 20. The support arm 31 includes a rotating member 311 connected to an outer side of the axle holder 22 and extending along the axis L1, and a cantilever member 312 pivotally connected to the rotating member 311. A locking member 313 is disposed in parallel to the axis L1 and adapted for locking the rotating member 311 to the axle holder 22 (see FIG. 6), and a saw blade guard 314 partially shields the saw blade 32. As illustrated in FIG. 2, the rotating member 311 has a plurality of equiangularly spaced locating holes 315, 316, 317 defined therein for selectively engaging with the locking pin 221. The locating hole 317 is of elongated arcuate shape. The saw blade 32 comprises a first end face 321, and a second end face 322 opposite to the first end face 321. The driver 33 faces toward the second end face 322, having a length L which is parallel to the saw blade 32 and a height or width H which is perpendicular to the saw blade 32 (see FIG. 4). The length L is larger than the height or width H.

Figure 5:
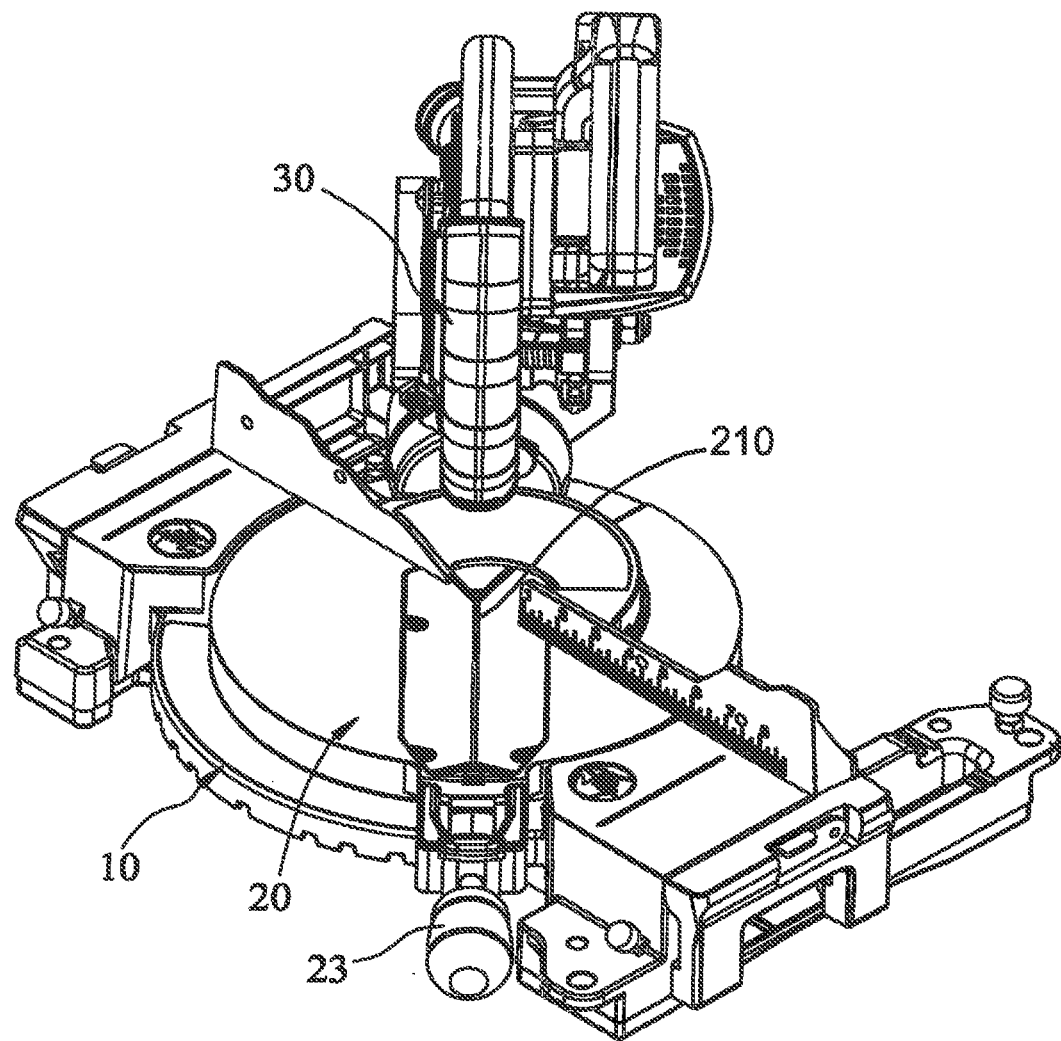
FIG. 5 is a schematic operating view of the present invention, illustrating the cutting unit turned with the worktable through 45° relative to the base unit.

As illustrated in FIG. 1 and FIG. 3, the miter saw is shown well assembled and set in a working position. In the working position, the driver 33 is suspended above the working surface 21 of the worktable 20. When the workpiece is placed on the working surface 21 and stopped against the fence 100, the saw blade 32 is vertically moved up and down relative to the rotating member 311 by operating the cantilever member 312 of the cutting unit 30, thereby performing a vertical cutting operation during which the rotating saw blade 32 is moved from a lifted position in which the saw blade 32 is spaced from the worktable, and a pressed position in which, upon cutting through a workpiece, an edge of the saw blade enters the longitudinal slot 210. As illustrated in FIG. 5, the operator biases the operating handle 23 for turning the worktable 20 and the cutting unit 30 relative to the base unit 10 for performing miter cut. As illustrated in FIGS. 1 and 2, the operator operates the locking member 313 and the locking pin 221 for enabling the support arm 31 to turn the saw blade 32 about the axis L1 relative to the worktable 20 within a predetermined angle range for performing bevel cuts. The support arm 31 is driven to turn the saw blade 32 about the axis L1 toward a left side or a right side, such that the locking pin 221 is either engaged with the middle locating hole 316 or the right-sided elongated arcuate locating hole 317 for locking the saw blade 32 in a position where a predetermined contained angle (not less than) 40° is formed between the second end face 322 of the saw blade 32 and the working surface 21, and the driver 33 is suspended above the working surface 21 of the worktable 20, thus a bevel cut can be performed. When the miter saw is temporarily not in use and needs to be stored or packed for delivery, the miter saw can be folded into a collapsed condition. The folding method comprises the steps as follows:

Step I: As shown in FIG. 1, prepare a miter saw as described above.

Step II: Set the cutting unit 30 in the working position where a contained angle formed between the saw blade 32 and the worktable 20 is between 90° to 45°, i.e., selectively engaging the locking pin 221 in the locating hole 316 or 317 to adjust the contained angle between the second end face 322 of the saw blade 32 and the working surface 21.

Step III: Turn the cutting unit 30 relative to the base unit 10, for example, in the present embodiment, the operator can rotate the worktable 20 and the cutting unit 30 to the position shown in FIG. 5, such that the cutting unit 30 is driven by the worktable 20 to rotate 45° toward the left edge 14.

Step IV: Thereafter, as shown in FIGS. 6-9, the operator operates the locking member 313 and the locking pin 221 to disengage the locking pin 221 from the locating hole 316 or 317 and then biases the support arm 31 with the rotating member 311 relative to the axle holder 22 for turning the cutting unit 30 about the axis L1 relative to the worktable 20 to the folded position where the second end face 322 of the saw blade 32 is kept in proximity and parallel to the working surface 21. The locking pin 221 is inserted into the locating hole 315 to lock the cutting unit 30 in the folded position. When the cutting unit 30 is locked in the folded position, the driver 33 is kept in proximity to the bottom wall 13 at a back side relative to the worktable 20 to face toward the rear edge 12, the rotating member 311 and the cantilever member 312 are disposed at the back side relative to the worktable 20, and the cutting unit 30 is disposed at a back side relative to the fence 100.

Thus, by performing the successive steps of the miter saw folding method of the present invention, an operator can fold the cutting unit 30 from a working position to the folded position.

Figure 6:
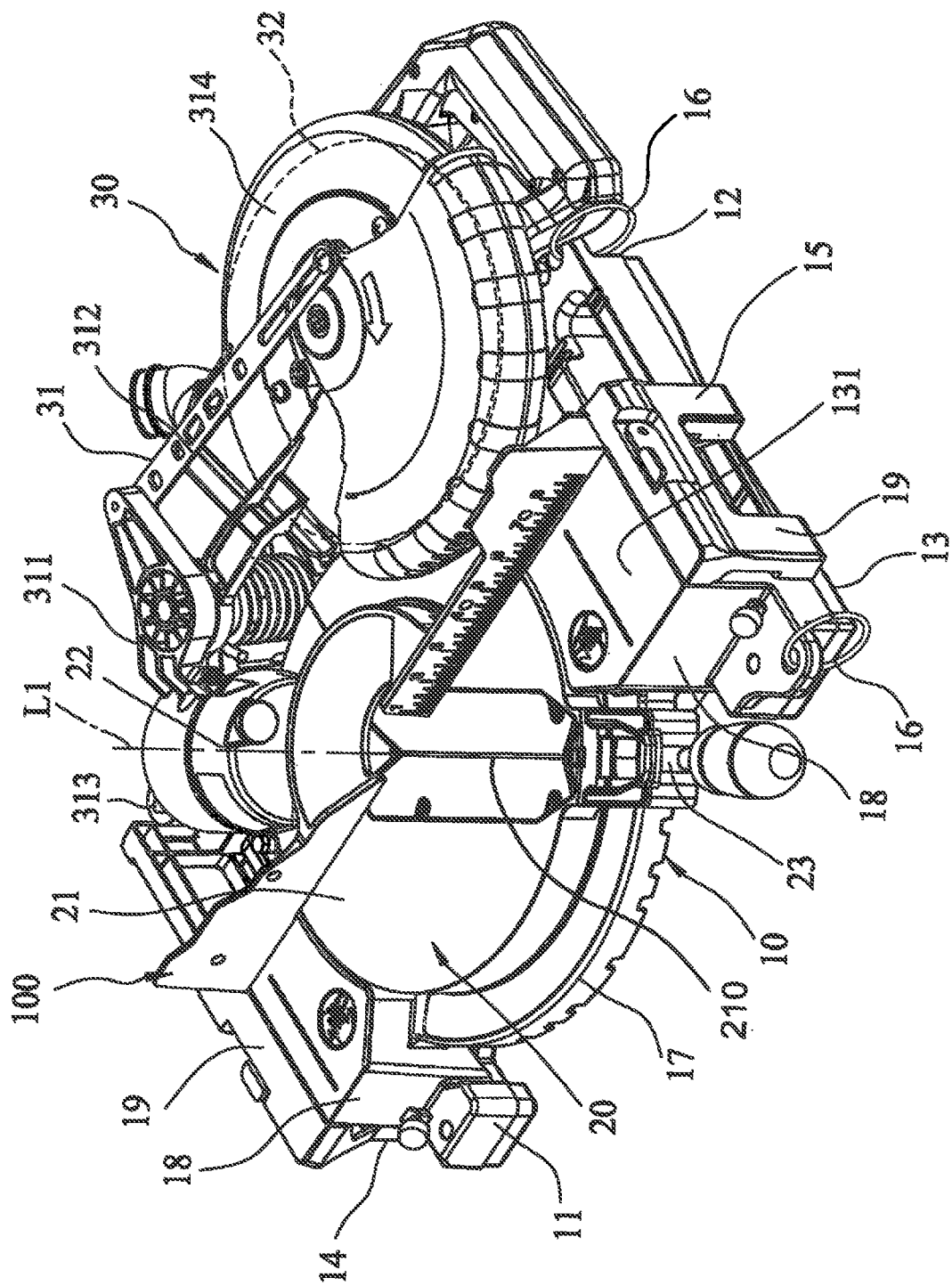
FIG. 6 is a top view of the present invention, illustrating the foldable miter saw in the folded position and the cutting unit received at the back side relative to the base unit.
Figure 7:
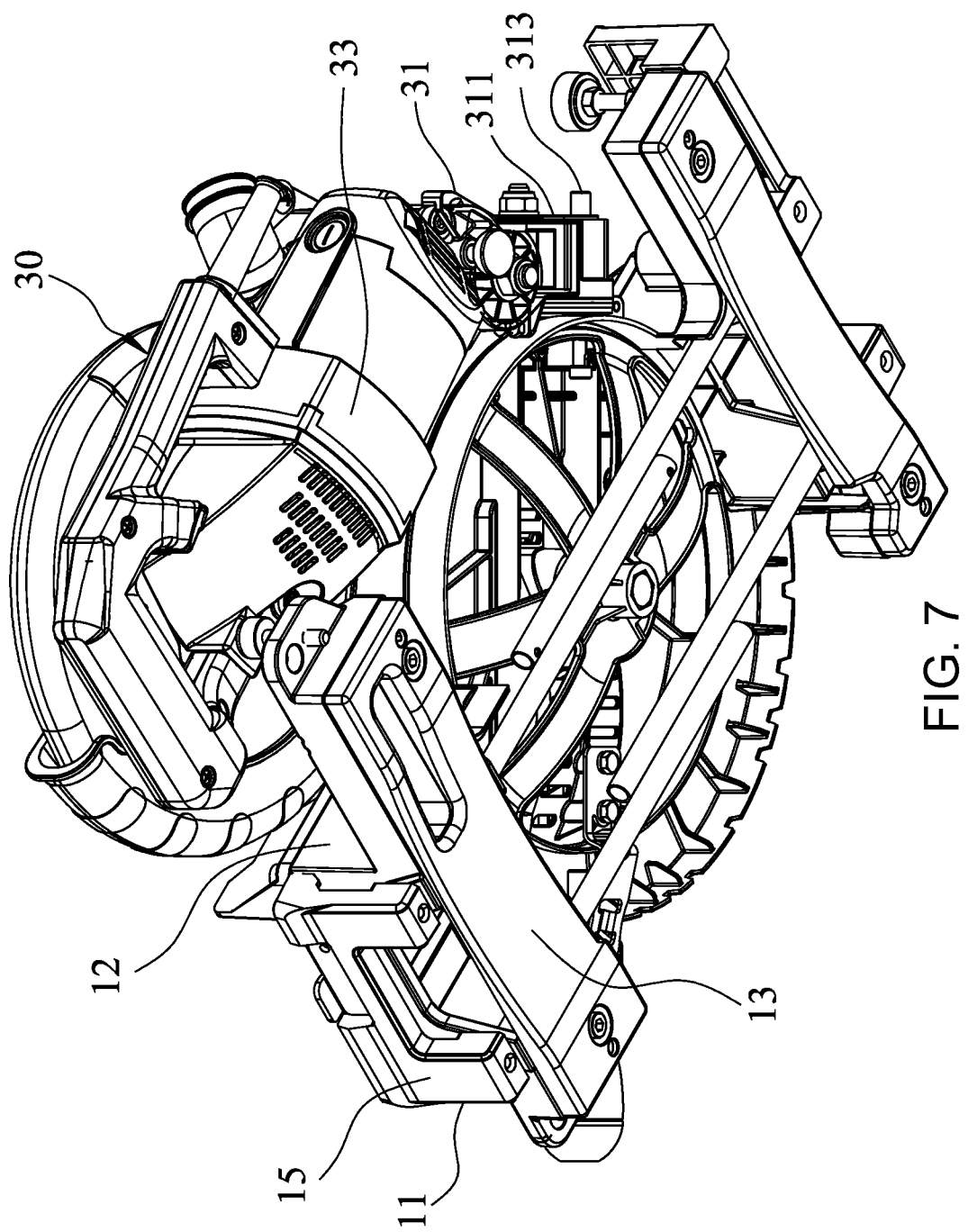
FIG. 7 is a bottom perspective view of the present invention, illustrating the foldable miter saw in the folded position.
Figure 8:
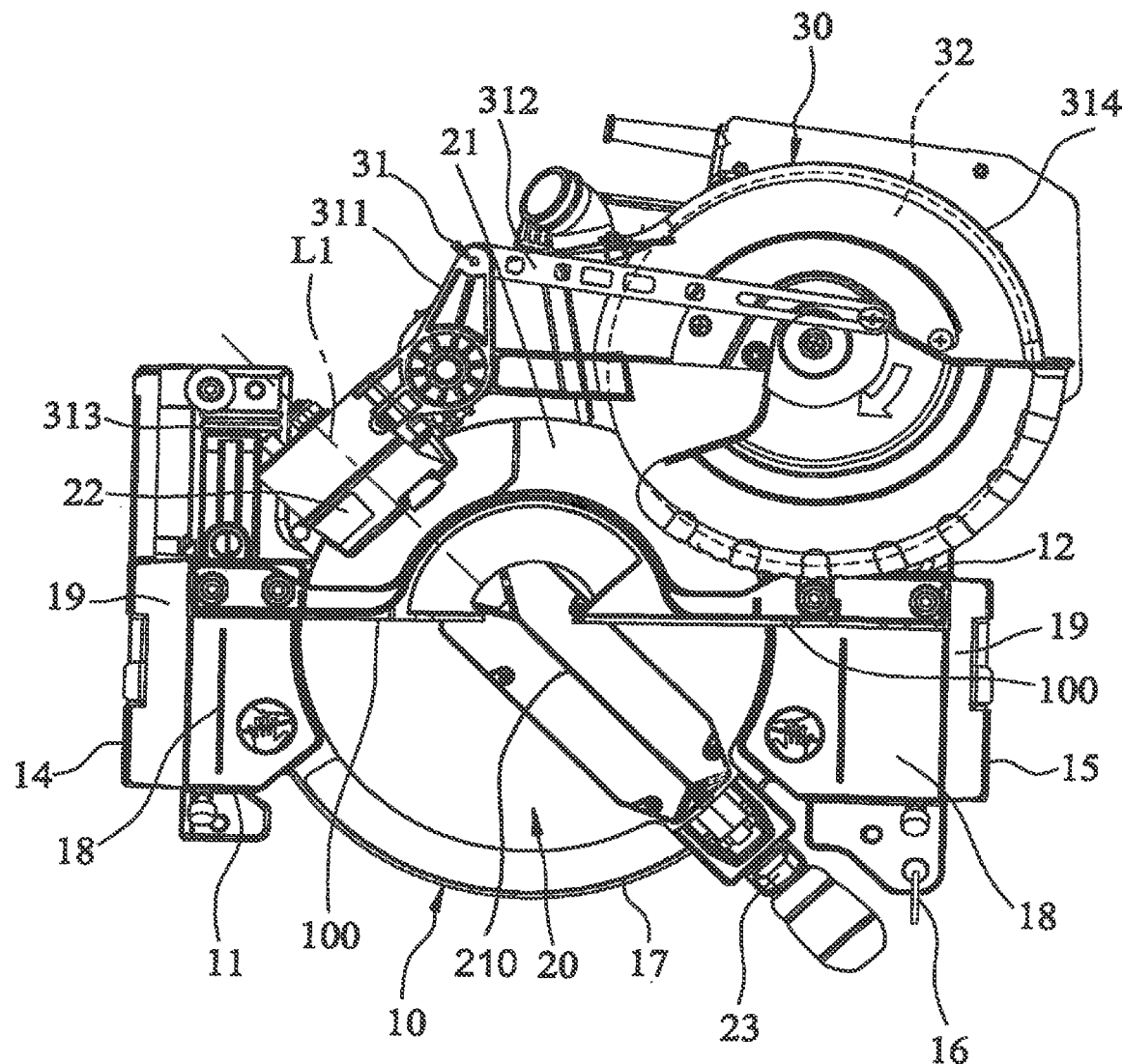
FIG. 8 is a top plane view of the present invention, illustrating the foldable miter saw in the folded position.
Figure 9:
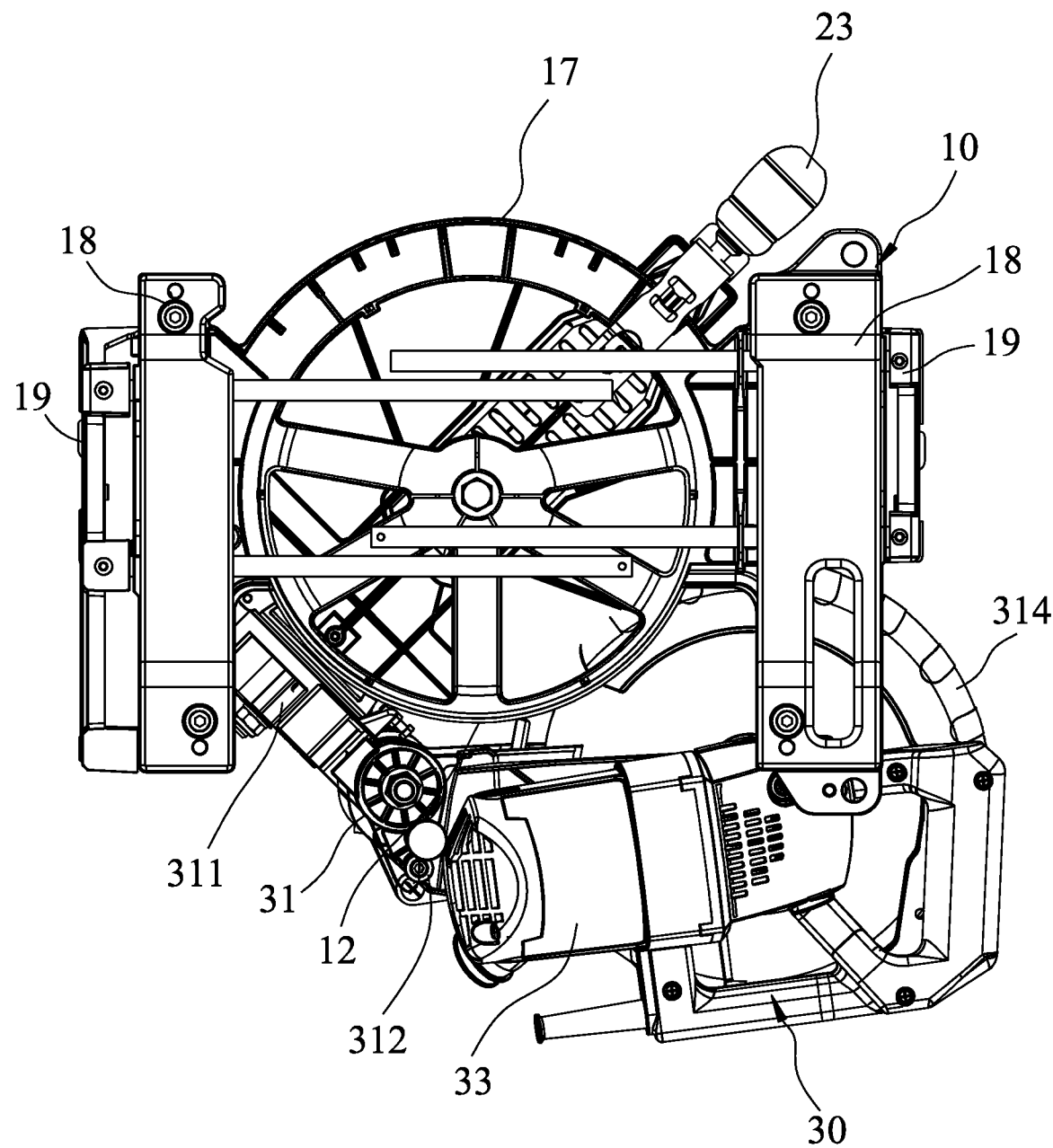
FIG. 9 is a bottom plane view of the present invention, illustrating the foldable miter saw in the folded position.

It's worth mentioning that except for the definition of the working position and folded position of the cutting unit 30 as described above, it can also be defined as follows. As illustrated in FIG. 3, when the cutting unit 30 is set in the working position, the cantilever member 312 of the cutting unit 30 can be biased relative to the rotating member 311 and the worktable 20 between a lifted condition (refer to the imaginary line in FIG. 3) and a pressed condition (see the solid line in FIG. 3). When the cutting unit 30 is biased to the pressed condition, a working height H1 is defined between the bottom wall 13 of the base unit 10 and the opposing topmost edge of the cutting unit 30. As illustrated in FIG. 6 and FIG. 10, when the cutting unit 30 is disposed in the folded position, the support arm 31 can be turned about the axis L relative to the base 10 and the worktable 20 so that a minimum height H2 is defined between the bottom wall 13 of the base unit 10 and the opposing topmost edge of the cutting unit 30. The working height H1 is larger than the minimum height H2. Further, the minimum height H2 is about one half of the working height H1.

It's also worth mentioning that the base unit of the foldable miter saw of the invention is not limited to the configuration described above. For example, the base unit can be as described in Taiwan Patent M374926, comprising a worktable, and first and second rotating units rotatable relative to the worktable. This alternate form can also achieve the expected operating and folding purposes (not shown).

Referring to FIG. 10, the protruding portion 142 of the left edge 14 protrudes outwardly from the flat surface portion 141, such that the left edge 14 can be abutted against the floor after the cutting unit 30 has been set in the folded position, thus enabling the bottom wall 13 of the base unit 10 to be supported on the wall. In this way, the bottom wall 13 is upwardly extended and gradually oriented toward the wall, preventing the foldable miter saw from falling down to the floor. Thus, the invention facilitates miter saw storage and space utilization.

Figure 11:
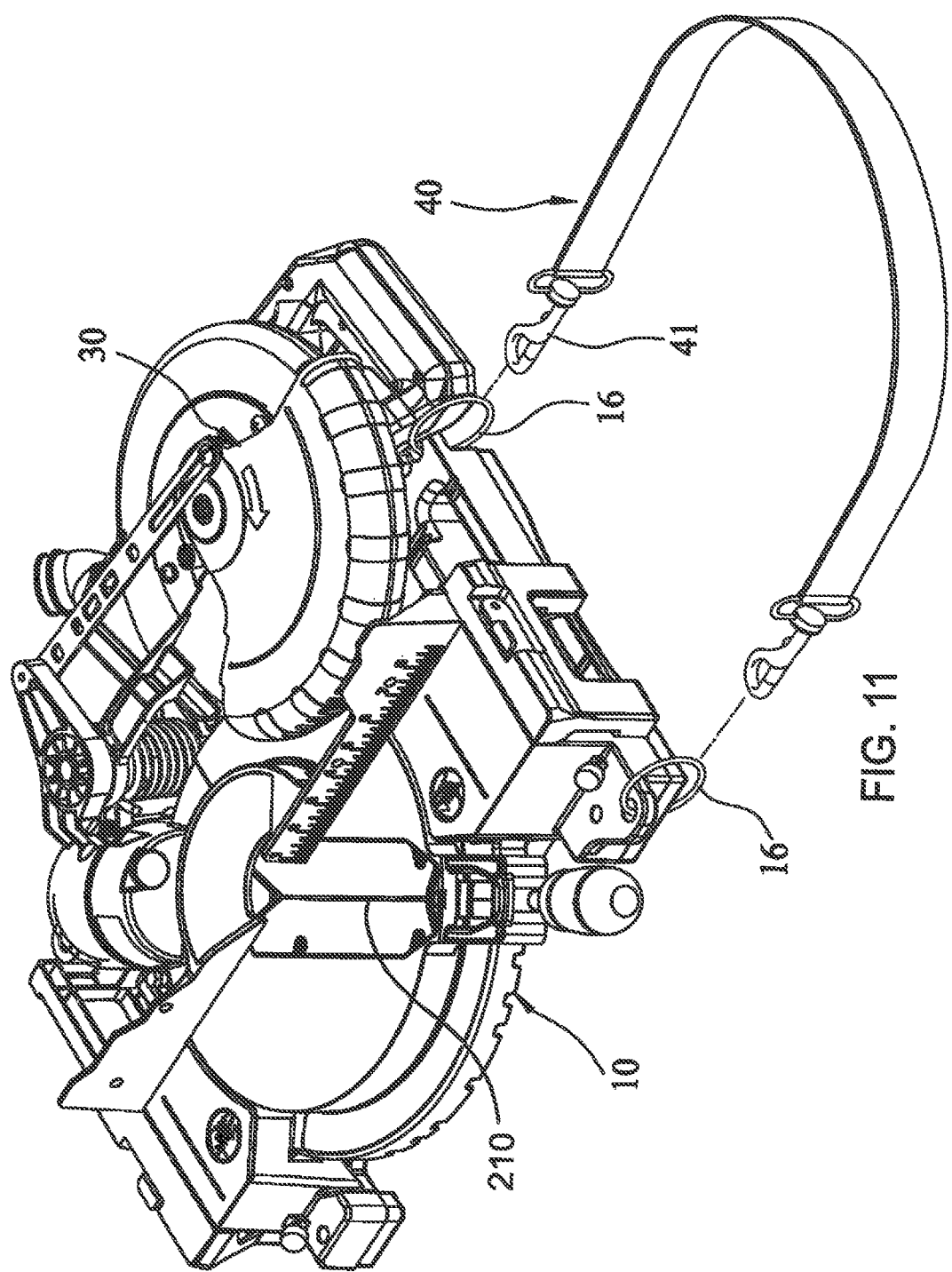
FIG. 11 is a schematic drawing illustrating a shoulder strap fastened to the base unit of the foldable miter saw for carrying.

Referring to FIG. 11, the foldable miter saw of the invention further comprises a shoulder strap 40. The shoulder strap 40 comprises two buckles 41 respectively detachably fastened to the hanging rings 16 of the base unit 10. By buckling the shoulder strap 40 to the base unit 10 after the foldable miter saw has been locked in the folded position, the foldable miter saw can be conveniently carried by a person for delivery.

In conclusion, the invention provides a foldable miter saw that can be conveniently converted to the working position for performing a cutting operation, and can also be conveniently converted to a folded position. When the foldable miter saw is in the folded position, the arrangement of the driver 33 and the cutting unit 30 can be turned to the back side of the base unit 10, the dimension of the foldable miter saw can be significantly reduced, facilitating storage and delivery and reducing the miter saw delivery cost.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A foldable miter saw, comprising:
   a base unit comprising a front edge, a rear edge opposite to said front edge, a bottom wall extended from said front edge to said rear edge, and a top wall opposite to said bottom wall;
   a worktable mounted at said base unit, said worktable comprising a working surface including a longitudinal slot and disposed opposite to said bottom wall and corresponding to said top wall and an axle holder facing toward said rear edge and connected to said working surface, said axle holder comprising an axis disposed in parallel to said working surface and extending from said rear edge toward said front edge; and
   a cutting unit comprising a support arm pivotally connected to said axle holder of said worktable for pivotal movement toward and away from said base unit and said worktable between a lifted position and a pressed position when said support arm is locked in a working position, a saw blade mounted at said support arm, and a driver adapted for driving said saw blade to rotate, said saw blade comprising a first end face and a second end face opposite to said first end face, wherein, said support arm is configured to be rotated about said axis relative to said base unit and said worktable:
  (a) to pivot said cutting unit between working positions in which a contained angle of 90° to 45° is formed between said saw blade and said worktable and the cutting unit is movable between the lifted position and the pressed position, and
  (b) to also pivot said cutting unit from one of the working positions to a folded position outside the contained angle, wherein, in the lifted position, the saw blade is spaced from the worktable, and in the pressed position, an edge of the saw blade enters the longitudinal slot in at least the 90° and 45° working positions; and
wherein in the folded position, said second end face of the saw blade is located in proximity to said working surface and facing toward said working surface, and said edge of the saw blade is positioned away from and unable to enter the longitudinal slot.

2. The foldable miter saw as claimed in claim 1, wherein said driver of said cutting unit is oriented toward said second end face of said saw blade; when said cutting unit is set in said working position, said driver is suspended above said working surface of said worktable; when said cutting unit is set in said folded position, said driver is located at a back side relative to said worktable in proximity to said bottom wall to face toward said rear edge.

3. The foldable miter saw as claimed in claim 2, wherein said driver of said cutting unit has a length in parallel to said saw blade and a width perpendicular to said saw blade, said length being larger than said width.

4. The foldable miter saw as claimed in claim 2, wherein said base unit further comprises a left edge disposed between said front edge and said rear edge, a right edge disposed opposite to said left edge, and two hanging rings located spaced from each other and respectively connected to said right edge; the foldable miter saw further comprises a shoulder strap, said shoulder strap comprising two buckles respectively and detachably connected to said hanging rings.

5. The foldable miter saw as claimed in claim 4, wherein said left edge of said base unit comprises a flat surface portion perpendicularly intersected with said bottom wall and extended from said bottom wall toward said top wall, and a protruding portion connected to a top side of said flat surface portion and protruded outwardly from said flat surface portion in proximity to said top wall.

6. The foldable miter saw as claimed in claim 1, wherein said support arm of said cutting unit comprises a rotating member pivotally connected to said axle holder of said worktable and extending along said axis, and a cantilever member pivotally connected to said rotating member, said rotating member and said cantilever member being disposed at a back side relative to said worktable when said cutting unit is set in said folded position.

7. The foldable miter saw as claimed in claim 6, wherein said support arm of said cutting unit further comprises a locking member disposed in parallel to said axis and adapted for locking said rotating member to said axle holder at a selected angle in said contained angle in said working position, and also for locking the cutting unit in said folded position.

8. The foldable miter saw as claimed in claim 1, wherein said base unit further comprises a fence fixedly mounted at said top wall and extendable to a top side of said working surface of said worktable; said cutting unit is disposed at a back side relative to said fence when said cutting unit is set in said folded position.

9. A miter saw folding method, comprising the steps of:
  (A) preparing a miter saw comprising a base unit, a worktable and a cutting unit, said base unit comprising a front edge, a rear edge opposite to said front edge, a bottom wall extended from said front edge to said rear edge, a top wall opposite to said bottom wall and a fence fixedly mounted at said top wall, said worktable being mounted at said base unit, said worktable comprising a working surface disposed opposite to said bottom wall and corresponding to said top wall and an axle holder facing toward said rear edge and connected to said working surface, said working surface including a longitudinal slot, said axle holder comprising an axis disposed in parallel to said working surface and extending from said rear edge toward said front edge, said cutting unit comprising a support arm pivotally connected to said axle holder of said worktable and for pivotal movement toward and away from said base unit and said worktable when the support arm is locked in a working position, a saw blade mounted at said support arm and a driver adapted for driving said saw blade to rotate, said saw blade comprising a first end face and a second end face opposite to said first end face, said support arm being turnable about said axis relative to said base unit and said worktable;
  (B) enabling said cutting unit to be disposed in the working position and to rotate, while in said working position, about said axis between angles that are within a contained angle of 90° to 45° between said saw blade and said worktable,
  (C) further enabling said cutting unit to be moved while operating said saw blade in said working position, from a lifted position in which the saw blade is spaced from the worktable to a pressed position in which an edge of the saw blade enters the longitudinal slot in at least the 90° and 45° working positions; and
  (D) pivotally moving said support arm relative to said axle holder to turn said cutting unit about said axis relative to said worktable from said working position to a folded position outside said contained angle, in which said second end face of said saw blade is disposed in proximity to said working surface, and said edge of the saw blade is positioned away from and unable to enter the longitudinal slot.

10. The saw folding method as claimed in claim 9, wherein in step (C) operating said base unit and said cutting unit for relative rotation therebetween is to rotate said worktable relative to said base unit.

11. The miter saw folding method as claimed in claim 10, wherein in step (A), said driver of said cutting unit faces toward said second end face of said saw blade; in step (B), said cutting unit is disposed in said working position where said driver is suspended above said working surface of said worktable; in step (D), said cutting unit is disposed in said folded position where said driver is disposed at a back side relative to said worktable and in proximity to said bottom wall to face toward said rear edge.

* * * * *